United States Patent
Rodier et al.

(10) Patent No.: US 6,805,321 B2
(45) Date of Patent: Oct. 19, 2004

(54) DEVICE FOR MOORING AN AIRCRAFT

(75) Inventors: Bernard Rodier, Saint Rogatien (FR); Bruno Gusseau, La Greve sur Mignon (FR)

(73) Assignee: Societe Technique d'Etudes, Realisations et Maintenances Energetiques, Perigny (FR)

(*) Notice: Subject to any disclaimer, the term of this patent is extended or adjusted under 35 U.S.C. 154(b) by 0 days.

(21) Appl. No.: 10/736,528

(22) Filed: Dec. 17, 2003

(65) Prior Publication Data

US 2004/0124309 A1 Jul. 1, 2004

(30) Foreign Application Priority Data

Dec. 17, 2002 (FR) .............................. 02 16070

(51) Int. Cl.⁷ .................................. B64F 1/12
(52) U.S. Cl. ..................... 244/115; 244/116
(58) Field of Search .............................. 244/115, 116; 410/10, 11, 23; 114/230.22, 230.23

(56) References Cited

U.S. PATENT DOCUMENTS

| 2,874,921 A | * | 2/1959 | Knighton et al. ........... 244/115 |
| 3,904,154 A | * | 9/1975 | Jones ..................... 244/110 R |
| 4,553,391 A | | 11/1985 | Reinhardt |
| 5,080,304 A | * | 1/1992 | Stump et al. ............... 244/115 |
| 5,292,089 A | * | 3/1994 | Whitman et al. ........... 244/115 |
| 5,570,858 A | * | 11/1996 | Craig ........................ 244/115 |
| 6,007,023 A | * | 12/1999 | Lehman .................. 244/110 R |

FOREIGN PATENT DOCUMENTS

EP          0 893 607 A1        1/1999

* cited by examiner

Primary Examiner—Charles T. Jordan
Assistant Examiner—T. Nguyen
(74) Attorney, Agent, or Firm—Young & Thompson

(57) ABSTRACT

A mooring device adapted particularly for an aircraft, includes at least one line (18) or the like ensuring connection between an anchoring point (20) on the aircraft and the ground, elements (26) for dynamically controlling the tension of the line (18) as a function of variations of the distance separating the anchoring point (20) on the aircraft to the ground.

12 Claims, 2 Drawing Sheets

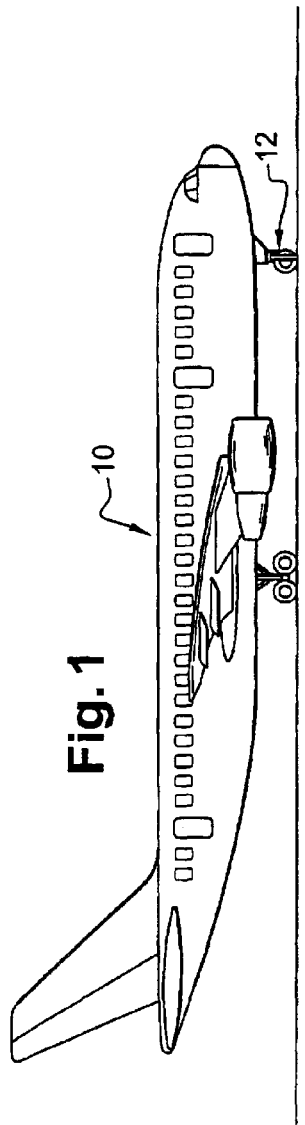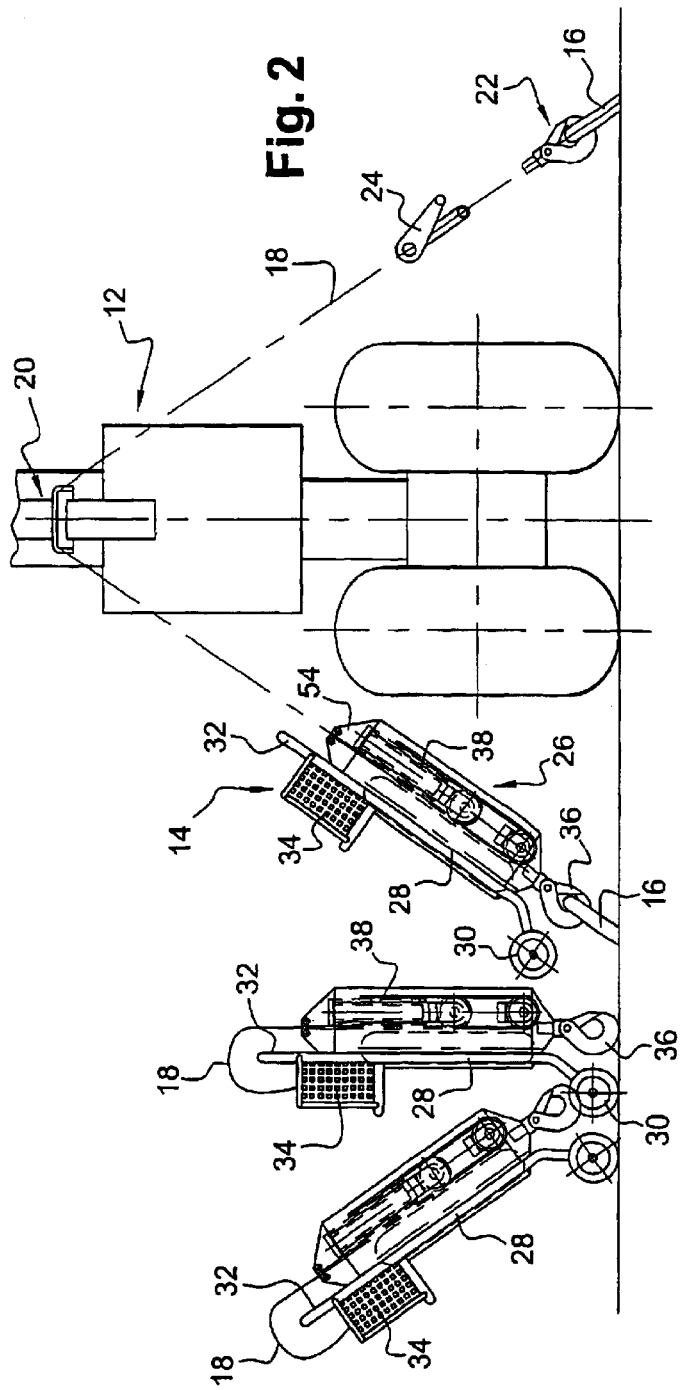

DEVICE FOR MOORING AN AIRCRAFT

The present invention relates to a device for mooring an aircraft. To avoid the movement of an aircraft in case of strong wind, its front landing gear is moored with the help of at least one line to at least one ring anchored in the ground. Also, the parking places for aircraft comprise at ground level flush rings which do not extend above ground level.

To carry out mooring, a first technique consists in providing at least one line whose first end is secured to a ring in the ground and the second end to an anchoring point on the aircraft. To obtain effective anchoring, it is preferable to use two lines which are connected to the aircraft symmetrically so as better to distribute the forces. A second technique consists in providing a single line whose ends are secured to two rings in the ground, disposed symmetrically relative to the front landing gear, the line passing through an anchoring point on the aircraft. This solution has the advantage of distributing symmetrically the forces and requiring only a single line.

Moreover, the mooring of the aircraft can also be necessary at the time of loading or unloading the aircraft so as to prevent it from tipping rearwardly. In this case, the mooring is carried out on the front landing gear.

These mooring techniques are not satisfactory for the following reasons. Even if the lines can comprise tensioning devices such as a ratchet tensioner, the tension is static and provided for only one condition of the aircraft. However, during its loading or unloading, the suspension of the front landing gear compresses or extends as a function of the load. In the case of extension, if the line or line were already tensioned, the supplemental tension by reason of the elevation of the aircraft can give rise to damage to the mooring. In case of compression, the line or line which were previously tensioned become slack because of the lowering of the aircraft and free in their movements, rendering mooring ineffective.

Also, the present invention seeks to overcome the drawbacks of the existing aircraft mooring devices, by providing a new device providing effective mooring continuously, despite changes in the posture of the aircraft.

To this end, the invention has for its object a mooring device adapted particularly for an aircraft, comprising at least one line or the like ensuring connection between an anchoring point on the aircraft and the ground, characterized in that it comprises dynamic control means of the tension of the line as a function of variations of the distance between the anchoring point on the aircraft and the ground. This arrangement permits having a line that is always tensioned despite variations of load on the suspension device, during loading or unloading of the aircraft.

Preferably, the device is adapted to occupy two conditions, the first so-called free condition in which it is adapted to follow the variations of distance between the anchoring point on the aircraft and the ground, by permitting elongation or shortening of the line, and a second so-called blocked condition, in which it opposes the unwinding of the line. According to another characteristic, the device comprises means adapted to measure the speed of unwinding of the line, said device passing from the free condition to the blocked condition when the unwinding speed exceeds a certain threshold or is subject to abrupt acceleration.

This arrangement permits limiting the risk of swinging of the aircraft rearwardly or its movement during a strong gust of wind.

Other characteristics and advantages will become apparent from the description which follows, of the invention, which description is given only by way of example, with respect to the accompanying drawings, in which:

FIG. 1 is a side elevational view of an aircraft.

FIG. 2 is a view showing the mooring device of the front landing gear of the aircraft.

Figure 3:
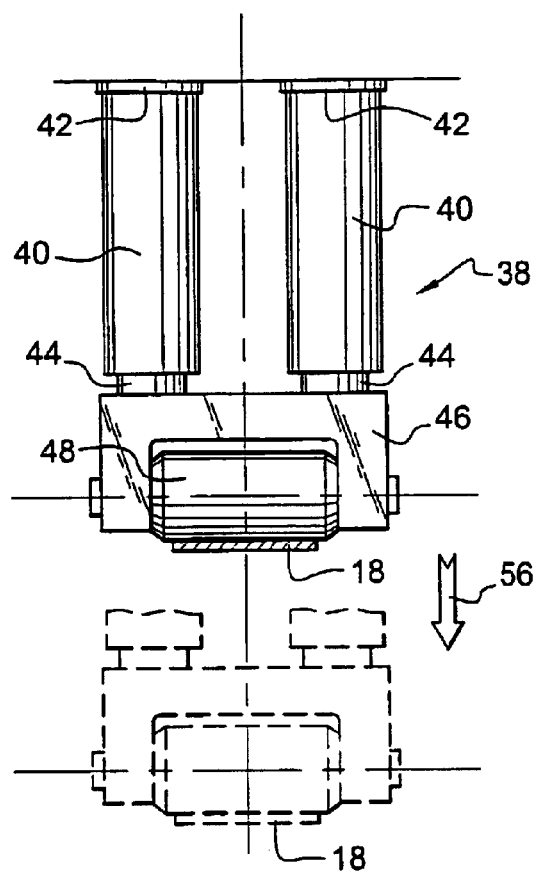
FIG. 3 is a detailed view showing one embodiment of a device for dynamic control of the tension of the line according to the invention.

In FIG. 1, there is shown at 10 an aircraft comprising particularly a front landing gear 12 shown in detail in FIG. 2.

So as to immobilize the aircraft 10 and/or to avoid its rearward swinging during loading or unloading, the upper portion of the front landing gear 12 disposed above the suspension (not shown) and secured to the body of the aircraft, is connected to the ground with the help of a mooring device 14.

One or more so-called anchoring rings 16 are provided at ground level so as to permit easier anchoring. These rings are preferably flush in horizontal position and disposed on each side of the front landing gear 12 so as to obtain symmetric distribution of the forces due to mooring.

According to techniques used, the mooring device 14 comprises one or more lines 18 connecting the upper part of the front landing gear to the ground. According to a preferred embodiment shown in FIG. 2, the securing device comprises a line 18 whose ends are connected to anchoring rings 16, said line passing through a ring or opening 20, called anchoring point of the aircraft, provided in the upper portion of the front landing gear. As a modification, there could be provided two lines 18, each having a first end connected to the anchoring point of the aircraft and a second end connected to the ground.

To permit easy securement, the line or lines comprise at their ends hooks 22, preferably with a tongue or in the form of a snap hook.

The line or lines 18 have a suitable length, and are made of suitable material to permit withstanding the forces. Moreover, a line can be made in a single piece or from several elements disposed end to end. Finally, the line can have different cross-sectional shapes, said sections being constituted by a single element or several elements disposed parallel or twisted.

In known manner, the line can be provided or not with static tensioning means 24 such as a ratchet tensioner.

According to the invention, the mooring device 14 comprises means 26 to control the tension of a line 18 dynamically, adapted to adjust the unwinding of the line 18 as a function of the variation or variations of the distance separating the anchoring point 20 on the aircraft with the anchoring point 16 on the ground.

According to a preferred embodiment shown in FIG. 2, the mooring device 14 comprises a carriage 28, with preferably at its lower portion rollers 30 and at its upper portion a handle 32 facilitating its movement, and a line 18 connected to a first end of the carriage 18 and comprising at the other end a hook 22, a ratchet tensioner 24 being preferably provided on the line. Preferably, the carriage 28 comprises means 34 for storing the line which can or not permit the automatic rewinding of said line 18.

In its lower portion, the carriage 28 comprises means for securement to the ground in the form for example of a hook 36 permitting the securement of the carriage and hence its line 18 to an anchoring ring.

As a modification, the carriage 28 can be connected to several lines 18.

According to the invention, the dynamic control device 26 for the tension of a line 18 is disposed on the carriage 28. This device 26 permits adjusting automatically and continuously the length of the line 18, when the distance separating the anchoring point 20 on the aircraft and the anchoring point on the ground varies, particularly during loading or unloading of the aircraft.

Preferably, this device 26 comprises means adapted to measure the speed of unwinding of the line 18. Thus, as soon as the speed of unwinding exceeds a certain threshold or is subject to abrupt acceleration, particularly when the aircraft tends to swing rearwardly or during a gust of wind, the device opposes the unwinding of the line so as to maintain a constant length between the anchoring point 20 on the aircraft and the anchoring point 16 on the ground.

The dynamic control device 26 for the tension of a line comprises means 38 which tend to tension the line 18, said means 38 being adapted to occupy two conditions, a first so-called free condition in which it is adapted to follow the variations of distance between the anchoring point 20 of the aircraft and the anchoring point 16 on the ground, by exerting on the line 18 a substantially constant tension and by permitting the elongation or shortening of the line, and a second so-called blocked condition, in which it opposes the unwinding of the line.

Figure 4:
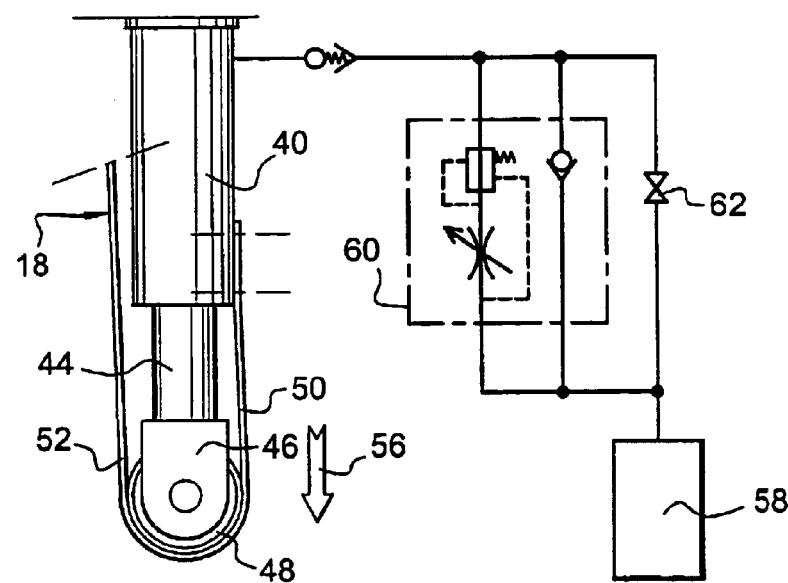
FIG. 4 is a schematic view illustrating the fluid circuits of the device of FIG. 3.

According to a preferred embodiment and shown in FIGS. 3 and 4, the means 38 are present in the form of a single acting jack 40, or preferably two jacks, whose base 42 of the body is connected to the upper portion of the carriage 28 and whose piston 44 oriented downwardly comprises at its end a shell 46 supporting a pulley or roller 48 adapted to apply tension to the line 18, whose first length at its end connected to the upper portion of the carriage 88 and second length 52 leave by an opening 54 also provided in the upper portion of the carriage 28. The jack or jacks 40 are single acting and tend to tension the line 18, as shown by the arrow 56. Thus, for a path of X mm of the piston 44, there is obtained a variation in the length of the line of 2X mm. In FIG. 3, there is shown the assembly in two different positions, pistons compressed and pistons extended.

As shown in FIG. 4, the jack or jacks 40 are connected to a reservoir 58 of fluid so as to ensure permanent adjustable tension in the line 18, particularly when the distance between the anchoring point 20 of the aircraft and the anchoring point to the ground decreases.

A unidirectional flow rate regulator 60, provided between the jack or jacks 40 and the reservoir 58, ensures a shock absorbing function to the unwinding of the line 18 and permits the compression of the jack or jacks 40, particularly when the distance between the anchoring point 20 of the aircraft and the anchoring point 16 on the ground increases. This regulator 60 also permits controlling the speed of unwinding of the line 18. Thus, as soon as the speed exceeds a certain threshold or is subject to abrupt acceleration, the regulator opposes the flow of fluid between the jack or jacks 40 and the reservoir 58, such that the jack or jacks 40 are in the blocked condition and oppose the unwinding of the line 18.

A so-called bypass valve 62 can be provided in parallel to the regulator 60 to connect the jack or jacks to the reservoir 58.

The operation of the device of the invention will now be described.

The carriage 28 is moved near the front landing gear 12 and its hook 36 is hooked to an anchoring ring 16. Then, the operator passes the line 18 through the anchoring point 20 of the aircraft and hooks the hook 22 to a second anchoring ring 16. He exerts a tension on the line 18 with the help of the ratchet tensioner 24 so as to place the tensioning means 38 in an appropriate condition. If the aircraft is loaded and the shock absorber of the front landing gear must extend, the tensioning means 38 will be almost not compressed. On the contrary, if the aircraft must be loaded and the front landing gear shock absorber must compress, the tension means will be compressed so as to be able to exert tension on the line.

During hooking and adjustment of the tension, the exhaust of the jack or jacks is open, the valve 52 being open. Afterward, in operation, the exhaust of the jack or jacks is controlled, and the valve 62 is closed.

According to another characteristic of the invention, visual information can be provided to permit adjustment of the tension at the time of correct mooring.

What is claimed is:

1. Mooring device particularly for an aircraft, comprising at least one line (18) ensuring connection between an anchoring point (20) on the aircraft and the ground, characterized in that it comprises means (26) for dynamically controlling the tension of the line (18) as a function of variations of the distance separating the anchoring point (20) on the aircraft and the ground, adapted to occupy two conditions, a first so-called free condition in which it is adapted to follow variations of distance between the anchoring point (20) on the aircraft and the ground while permitting the elongation or shortening of the line (18), and a second so-called blocked condition, in which it opposes the unwinding of the line (18) when the speed of unwinding exceeds a certain threshold or is subject to abrupt acceleration.

2. Device according to claim 1, characterized in that it comprises means adapted to measure the speed of unwinding of the line (18).

3. Device according to claim 1, characterized in that the dynamic means (26) for controlling the tension of the line (18) comprises means (38) which tends to tension the line (18).

4. Device according to claim 3, characterized in that the means (38) are present in the form of at least one single acting jack (40) whose piston (44) is oriented such that pressing means (46, 48) disposed at its end apply tension to the line (18).

5. Device according to claim 4, characterized in that it comprises a flow rate regulator (60) in the exhaust of the jack or jacks (40), ensuring the function of a shock absorber to the unwinding of the line (18) and permitting controlling the speed of unwinding of said line (18).

6. Device according to claim 4, characterized in that the means (26) for dynamic control of the tension are disposed in a carriage (28), the piston (44) tending to move downwardly so as to apply tension on the line (18) of which one length (52) exits through an opening (54) provided in an upper portion of the carriage (28).

7. Device according to claim 6, characterized in that the carriage (28) comprises means for securement to the ground.

8. Device according to claim 1, characterized in that it comprises means for automatically rewinding the line (18).

9. Device according to claim 2, characterized in that the dynamic means (26) for controlling the tension of the line (18) comprises means (38) which tends to tension the line (18).

10. Device according to claim 9, characterized in that the means (38) are present in the form of at least one single acting jack (40) whose piston (44) is oriented such that pressing means (46, 48) disposed at its end apply tension to the line (18).

11. Device according to claim 5, characterized in that the means (26) for dynamic control of the tension are disposed in a carriage (28), the piston (44) tending to move downwardly so as to apply tension on the line (18) of which one length (52) exits through an opening (54) provided in an upper portion of the carriage (28).

12. Device according to claim 11, characterized in that the carriage (28) comprises means for securement to the ground.

* * * * *